(12) United States Patent
Takanezawa

(10) Patent No.: US 8,279,224 B2
(45) Date of Patent: Oct. 2, 2012

(54) INFORMATION PROCESSING APPARATUS, DISPLAY CONTROL METHOD, AND STORAGE MEDIUM

(75) Inventor: Tetsuhiro Takanezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/025,286

(22) Filed: Feb. 4, 2008

(65) Prior Publication Data

US 2008/0204786 A1      Aug. 28, 2008

(30) Foreign Application Priority Data

Feb. 23, 2007   (JP) ................................ 2007-044530

(51) Int. Cl.
*G06T 11/20* (2006.01)
*G09G 5/22* (2006.01)
*H04N 5/765* (2006.01)
*H04N 5/931* (2006.01)
*H04N 5/932* (2006.01)
*H04N 5/935* (2006.01)

(52) U.S. Cl. ........ 345/440; 348/143; 386/200; 386/201; 386/207

(58) Field of Classification Search .................. 345/440; 348/143; 386/E9.06, E5.037, 13, 85, 200, 386/201, 207
See application file for complete search history.

(56) References Cited

U.S. PATENT DOCUMENTS

| | | | | |
|---|---|---|---|---|
| 5,388,197 | A * | 2/1995 | Rayner | 715/723 |
| 5,732,184 | A * | 3/1998 | Chao et al. | 386/282 |
| 2002/0033960 | A1 | 3/2002 | Kazami | 358/1.14 |
| 2003/0123078 | A1 | 7/2003 | Kazami | 358/1.14 |
| 2007/0189333 | A1* | 8/2007 | Naaman et al. | 370/477 |
| 2007/0300272 | A1 | 12/2007 | Takanezawa | 725/105 |

FOREIGN PATENT DOCUMENTS

| | | |
|---|---|---|
| JP | 10-124353 | 5/1998 |
| JP | 2004-178607 A | 6/2004 |
| JP | 2006-030389 A | 2/2006 |
| JP | 2006-300874 A | 11/2006 |

* cited by examiner

*Primary Examiner* — James A Thompson
*Assistant Examiner* — Jed-Justin Imperial
(74) *Attorney, Agent, or Firm* — Fitzpatrick, Cella, Harper & Scinto

(57) ABSTRACT

An object of the invention is to improve convenience in using a system capable of recording electronic data in association with time information. To achieve this object, an information processing apparatus of this invention includes a display control device which displays, on a display device together with a time line, time information which is obtained from a timer and associated with electronic data recorded by a recording control device, and a processing device which determines on the basis of the time information associated with the electronic data whether a count of the timer was corrected, wherein if it is determined that the count of the timer was corrected, the display control device displays, on the display device together with the time line, information representing correction contents of the time information.

18 Claims, 16 Drawing Sheets

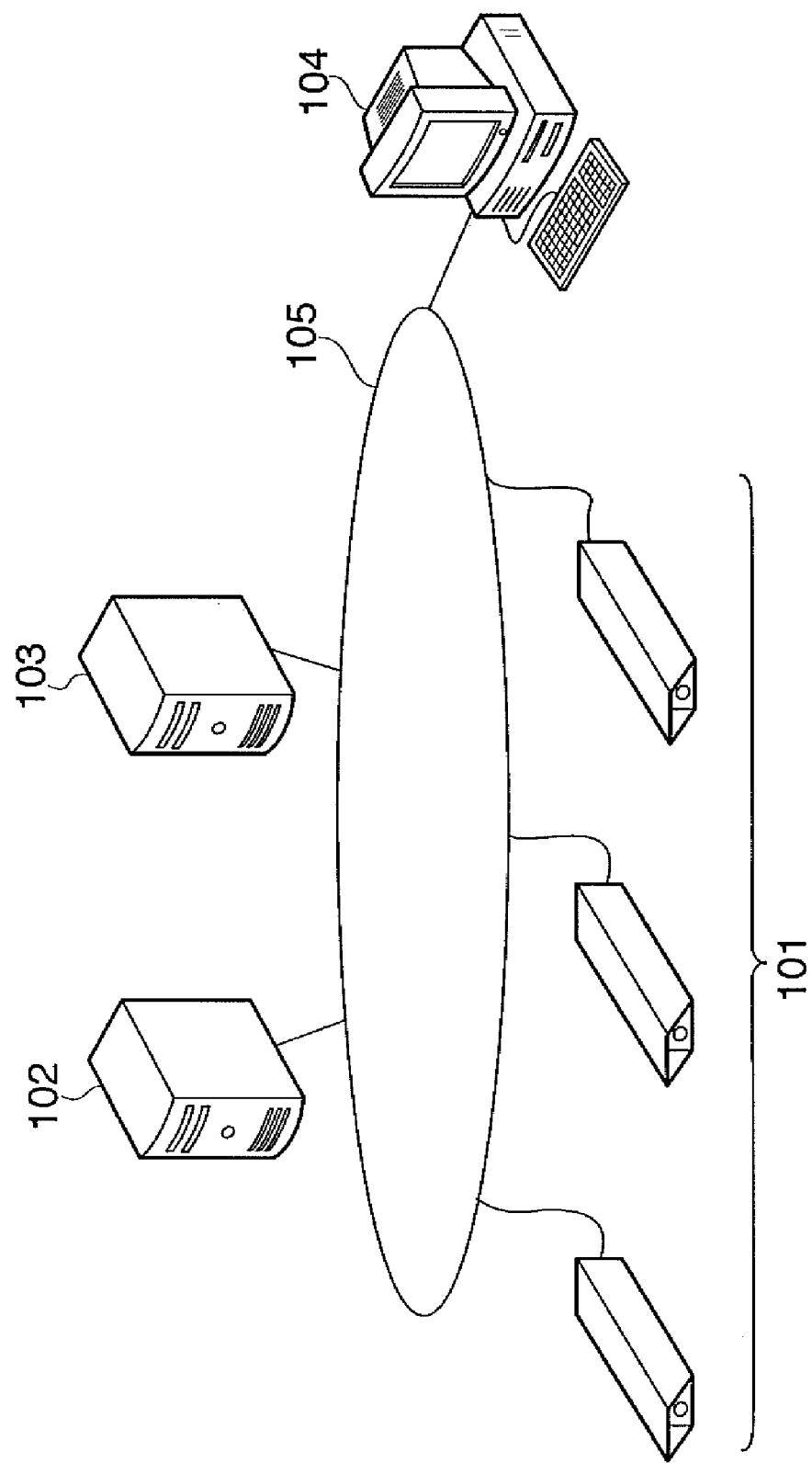

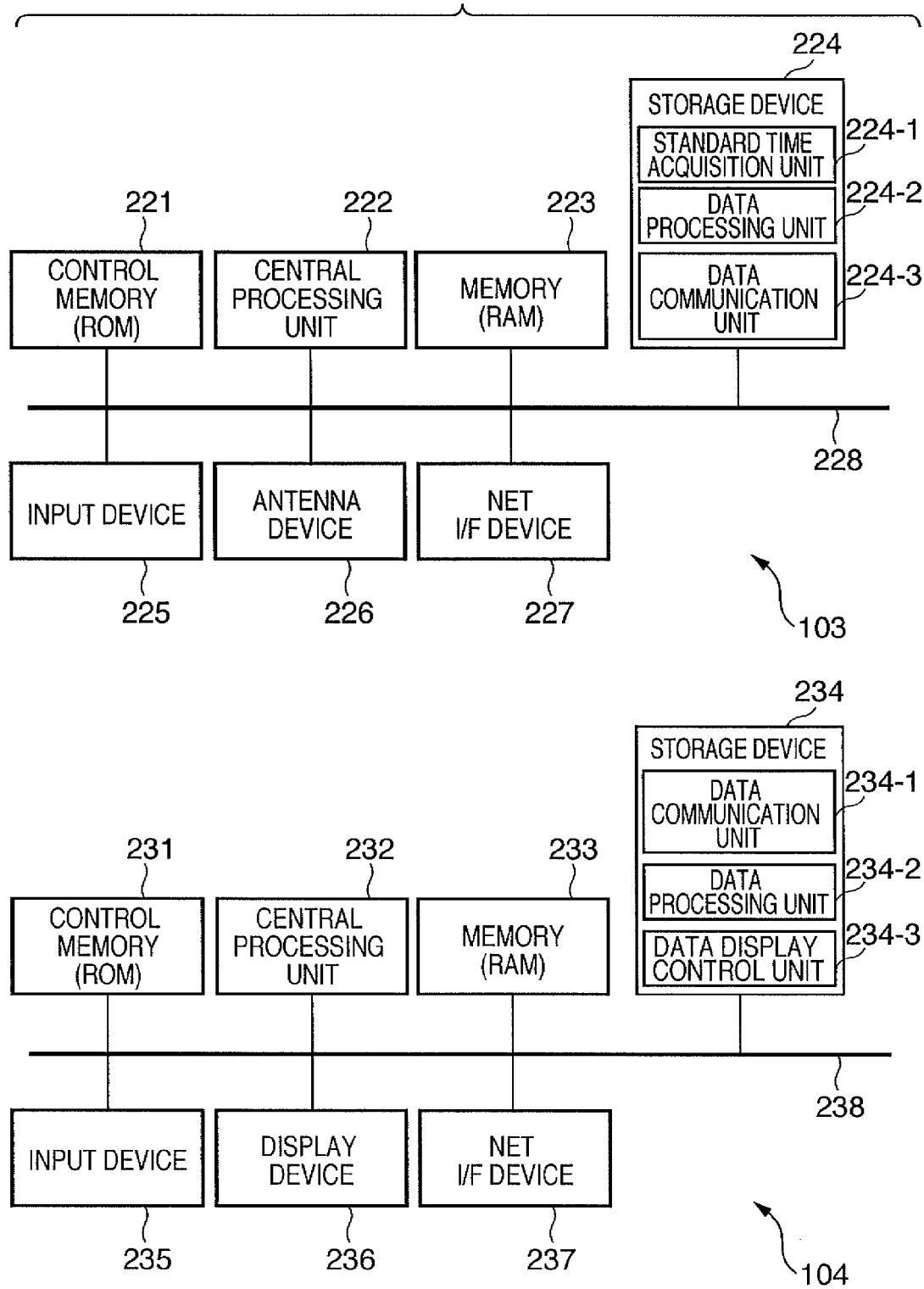

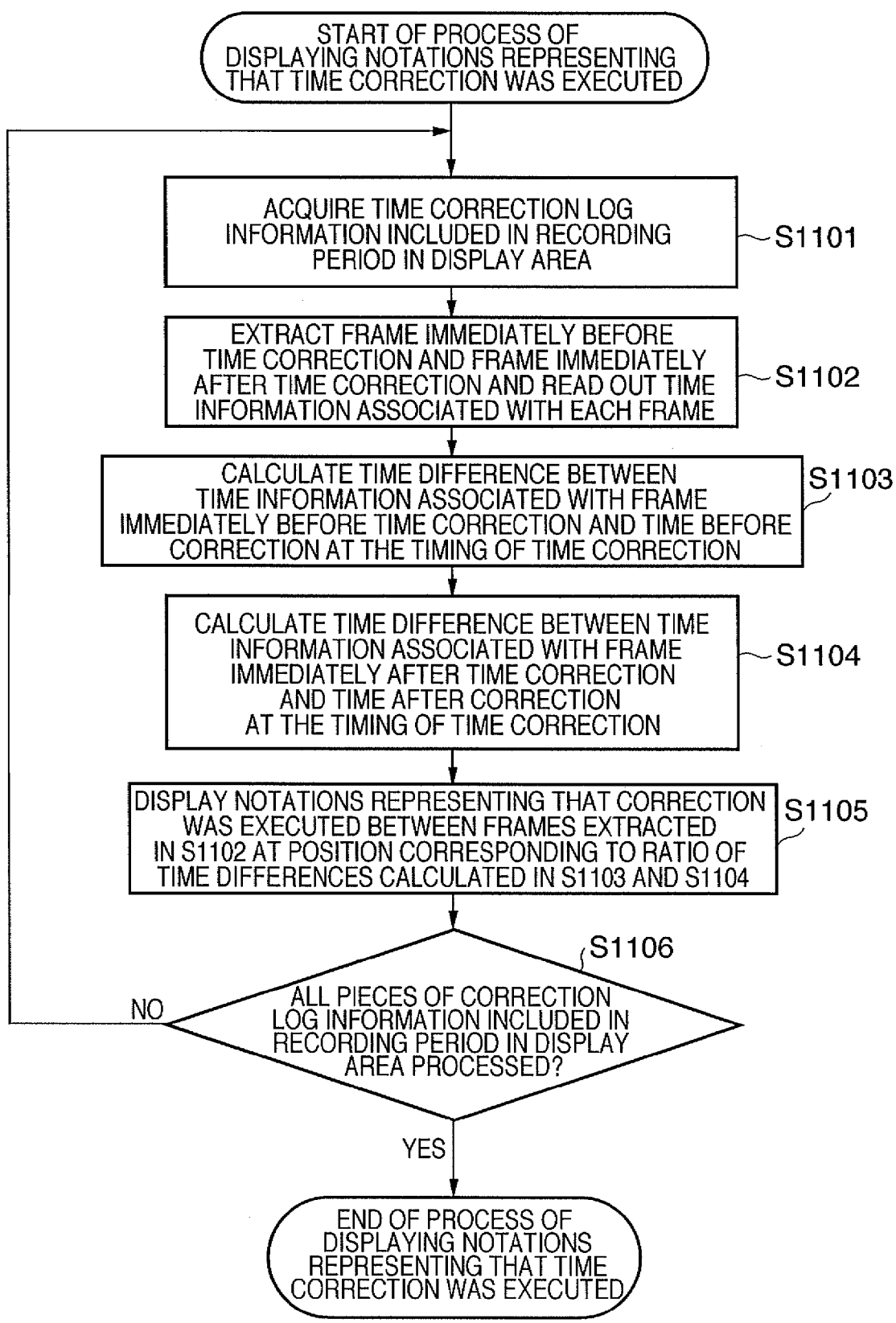

INFORMATION PROCESSING APPARATUS, DISPLAY CONTROL METHOD, AND STORAGE MEDIUM

BACKGROUND OF THE INVENTION

1. Field of the Invention

The present invention relates to an information processing apparatus, a display control method and storage medium, particularly to a display control technique of displaying, on a display device, process contents in a recording means in a system capable of recording electronic data in the recording means in association with date/time information.

2. Description of the Related Art

In monitoring systems that are conventionally known, image data captured by a surveillance camera is transmitted through, for example, the Internet and viewed on a monitor in a remote site or recorded in a recording apparatus.

Such a system generally records received image data after associating it with time information acquired from an internal clock (e.g., Japanese Patent Laid-Open No. 10-124353).

In this system, therefore, time information to be associated with image data is preferably as accurate as possible.

Normally, a clock incorporated in, for example, a recording apparatus gradually generates a time shift along with the elapse of time. It is therefore necessary to periodically correct the time shift (time correction).

However, if the time of the internal clock is corrected during continuous image data transmission from a surveillance camera, time information associated with image data becomes discontinuous before and after the time correction.

For example, when the time of the internal clock is advanced by correction, a time interval corresponding to the amount of correction occurs between time information associated with a frame immediately before the correction and that associated with a frame immediately after the correction, even though the frames are transmitted continuously.

When the time of the internal clock is delayed by correction, the order of time information associated with a frame immediately before the correction and that associated with a frame immediately after the correction is reverse to the transmission order. That is, a frame transmitted earlier is associated with later time information.

For these reasons, if the time of the internal clock is corrected, image data before and after correction are hard to search based on time information. To improve convenience for the search, a demand has arisen for visualizing the correction contents of time correction of the internal clock and presenting them to a user in an easily recognizable form.

SUMMARY OF THE INVENTION

The present invention has been made in consideration of the above problem, and has as its object to improve convenience in using a system capable of recording electronic data in a recording means in association with date/time information.

To achieve the above object, an information processing apparatus according to the invention comprises the following configuration. That is, an information processing apparatus comprises:

a display control device which controls of a display of time information on a time line, the time information being obtained from a timer and associated with electronic data recorded by a recording control device; and a processing device which determines whether a count of the timer is corrected based on the time information associated with the electronic data, wherein if it is determined that the count of the timer is corrected, the display control device controls a display of information representing correction contents of the time information on the time line.

To achieve the above object, a display control method according to the invention comprises the following configuration. That is, a display control method of an information processing apparatus, comprises the steps of:

determining whether a count of the timer is corrected based on time information which is obtained from a timer and associated with electronic data recorded by a recording control device; and controlling of a display, on a time line, the time information associated with the electronic data, wherein in the display controlling step, if it is determined that the count of the timer is corrected, information representing correction contents of the time information is displayed on the time line.

According to the present invention, in a system capable of recording electronic data in a recording means in association with date/time information, convenience in using the system improves.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing the system configuration of a monitoring system 100 having an information processing apparatus (terminal apparatus 104) according to the first embodiment of the present invention;

FIG. 2B is a block diagram showing the hardware configurations of a time server 103 and terminal apparatus 104 included in the monitoring system 100;

FIG. 11 is a flowchart illustrating details of a process (step S902) of displaying notations (805 and 806 in FIG. 8) representing that time correction was executed;

DESCRIPTION OF THE EMBODIMENTS

Figure 2A:
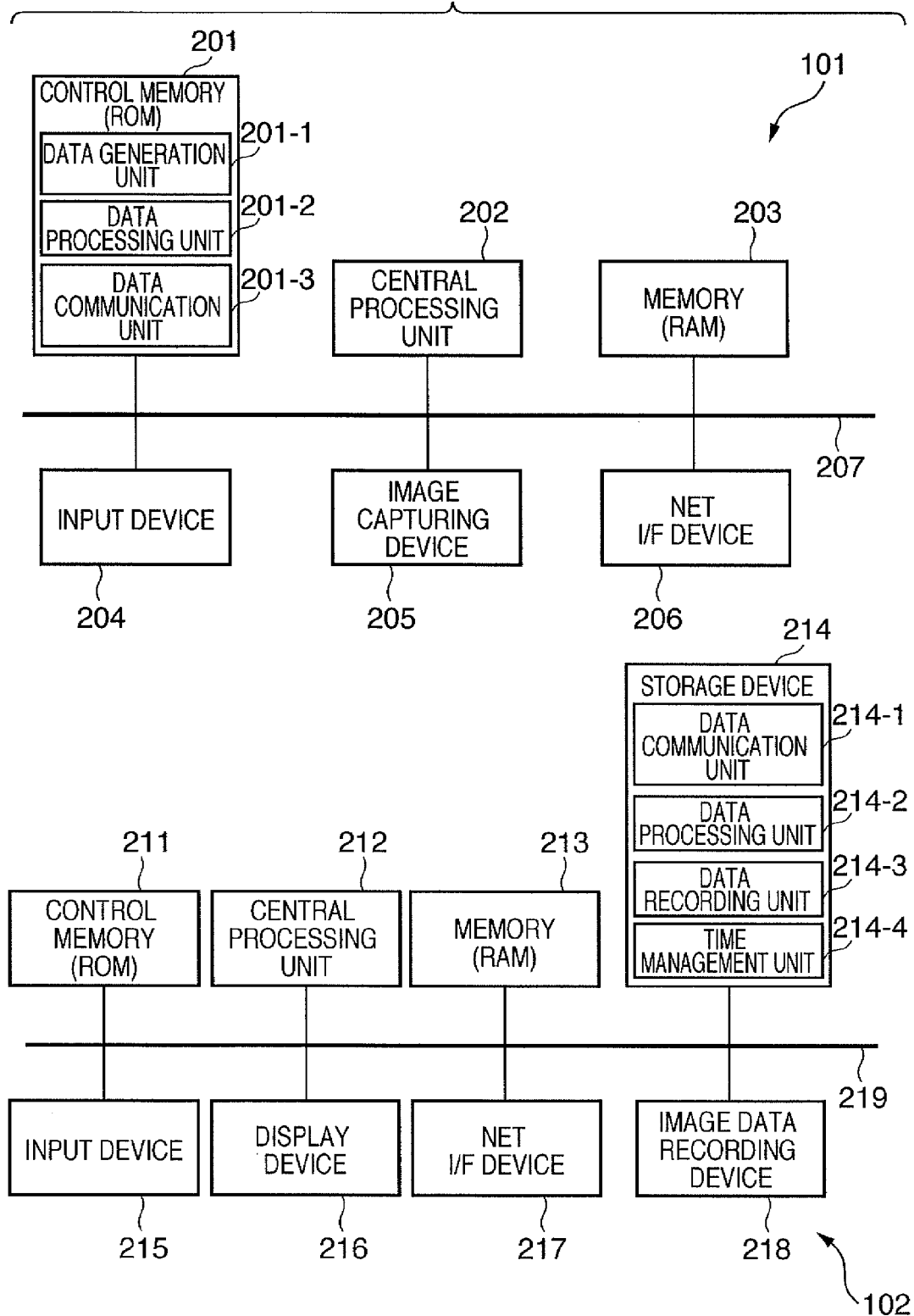
FIG. 2A is a block diagram showing the hardware configurations of a surveillance camera 101 and server apparatus 102 included in the monitoring system 100.

Preferred embodiments of the present invention will now be described in detail in accordance with the accompanying drawings.

First Embodiment

An embodiment of the present invention will be described below in detail with reference to the accompanying drawings.

<1. System Configuration of Monitoring System>

FIG. 1 is a view showing the system configuration of a monitoring system 100 having an information processing apparatus (terminal apparatus 104) according to the first embodiment of the present invention. Referring to FIG. 1, a surveillance camera 101 acquires image data of a predetermined process unit (frame in this case) by continuously capturing a monitoring target and sequentially transmits the image data to a server apparatus 102 via the Internet 105.

The server apparatus 102 receives each frame of image data transmitted from the surveillance camera 101 via the Internet 105. The server apparatus 102 associates time information acquired based on an internal clock with each frame of the image data and then records it.

A time server 103 serves as a timer which transmits "standard time" as accurate time information to the server apparatus 102. The server apparatus 102 corrects the internal clock based on the standard time periodically transmitted from the time server 103.

The terminal apparatus 104 accesses the server apparatus 102 via the Internet 105 and displays the process contents (the correction contents of the internal clock) of the server apparatus 102 in a predetermined time region.

<2. Hardware Configuration of Each Apparatus>

The hardware configurations of the apparatuses 101 to 104 included in the monitoring system 100 will be described next with reference to FIGS. 2A and 2B.

In FIG. 2A, reference numbers 101 and 102 indicate the hardware configurations of the surveillance camera 101 and server apparatus 102 included in the monitoring system 100. In FIG. 2B, reference numbers 103 and 104 indicate the hardware configurations of the time server 103 and terminal apparatus 104 included in the monitoring system 100.

<2.1 Hardware Configuration of Surveillance Camera 101>

Reference number 101 in FIG. 2A shows the hardware configuration of the surveillance camera 101. As indicated by reference number 103 in FIG. 2A, the surveillance camera 101 comprises a control memory (ROM) 201, central processing unit (CPU) 202, memory (RAM) 203, input device 204, image capturing device 205, NET I/F device 206, and bus 207.

The control memory 201 stores control programs for implementing various processing functions of the surveillance camera 101 and data to be used by the control programs. The control programs and data are loaded in the memory 203 as needed via the bus 207 under the control of the central processing unit 202 and are executed by the central processing unit 202.

The control programs for implementing the processing functions of the surveillance camera 101 include programs which function as a data generation unit 201-1, data processing unit 201-2, and data communication unit 201-3.

The data generation unit 201-1 implements a function of generating image data by controlling the image capturing device 205 and continuously capturing the monitoring target. The data processing unit 201-2 implements a function of executing a predetermined correction process of, for example, associating "time interval information" representing the time interval between generated frames with each frame of the generated image data. The data communication unit 201-3 implements a function of transmitting the corrected image data to the Internet 105 via the NET I/F device 206.

<2.2 Hardware Configuration of Server Apparatus 102>

Reference number 102 in FIG. 2A shows the hardware configuration of the server apparatus 102. The server apparatus 102 comprises a control memory (ROM) 211, central processing unit (CPU) 212, memory (RAM) 213, storage device 214, input device 215, display device 216, NET I/F device 217, image data recording device 218, and bus 219.

The computer-readable storage device 214 stores control programs for implementing the processing functions of the server apparatus 102 and data to be used by the control programs. The control programs and data are loaded in the memory 213 as needed via the bus 219 under the control of the central processing unit 212 and are executed by the central processing unit 212.

The control programs for implementing the processing functions of the server apparatus 102 include programs which function as a data communication unit 214-1, data processing unit 214-2, data recording unit 214-3, and time management unit 214-4.

The data communication unit 214-1 implements a function of controlling the NET I/F device 217 and receiving image data transmitted from the surveillance camera 101 via the Internet 105. The data communication unit 214-1 also implements a function of receiving the standard time transmitted from the time server 103. The data communication unit 214-1 also implements a function of transmitting, to the terminal apparatus 104, "correction log information" (to be described later) to be recorded in the image data recording device 218 when the time of the internal clock was corrected.

The data processing unit 214-2 implements various processes for the received image data. More specifically, the data processing unit 214-2 implements a function of associating "time information" acquired from the internal clock (not shown) of the server apparatus 102 with each frame of the received image data. The data processing unit 214-2 also implements a function of associating a "recording order" of the frames of the received image data with each frame.

The data recording unit 214-3 implements a function of recording, in the image data recording device 218, each frame of the image data associated with the time information. The data recording unit 214-3 also implements a function of recording, as "correction log information" in the image data recording device 218, correction information transmitted from the time management unit 214-4 when the internal clock was corrected.

The time management unit 214-4 implements a function of reading out time information from the internal clock of the server apparatus 102 and sending the readout time information to the data processing unit 214-2. The time management unit 214-4 also implements a function of correcting the time shift of the internal clock of the server apparatus 102 based on the standard time transmitted from the time server 103. When the time shift of the internal clock of the server apparatus 102 was corrected, the time management unit 214-4 implements a function of sending correction information to the data processing unit 214-2. The correction information contains "data representing that the time shift of the internal clock was corrected", "time before correction of time information", "time after correction of time information (standard time)", "correction direction", and "amount of correction".

<2.3 Hardware Configuration of Time Server 103>

Reference number 103 in FIG. 2B shows the hardware configuration of the time server 103. The time server 103 comprises a control memory (ROM) 221, central processing unit (CPU) 222, memory (RAM) 223, storage device 224, input device 225, antenna device 226, NET I/F device 227, and bus 228.

The computer-readable storage device 224 stores control programs for implementing various processing functions of the time server 103 and data to be used by the control programs. The control programs and data are loaded in the memory 223 as needed via the bus 228 under the control of the central processing unit 222 and are executed by the central processing unit 222.

The control programs for implementing the processing functions of the time server 103 include programs which function as a standard time acquisition unit 224-1, data processing unit 224-2, and data communication unit 224-3.

The standard time acquisition unit 224-1 implements a function of acquiring the standard time via the antenna device 226 that receives standard frequency and time signal waves. Note that the standard time may be acquired by communication with, for example, an external NTP server. In this case, the standard time acquisition unit 224-1 implements the function of acquiring the standard time by controlling the NET I/F device 227 that communicates with the NTP server.

The data processing unit 224-2 implements a function of collectively controlling the processes of the entire time server 103. The data communication unit 224-3 implements a function of controlling the NET I/F device 227 to transmit the acquired standard time to the server apparatus 102 via the Internet 105.

<2.4 Hardware Configuration of Terminal Apparatus 104>

Reference number 104 in FIG. 2B shows the hardware configuration of the terminal apparatus 104. The terminal apparatus 104 comprises a control memory (ROM) 231, central processing unit (CPU) 232, memory (RAM) 233, storage device 234, input device 235, display device 236, NET I/F device 237, and bus 238.

The computer-readable storage device 234 stores control programs for implementing various processing functions of the terminal apparatus 104 and data to be used by the control programs. The control programs and data are loaded in the memory 233 as needed via the bus 238 under the control of the central processing unit 232 and are executed by the central processing unit 232.

The control programs for implementing the processing functions of the terminal apparatus 104 include programs which function as a data communication unit 234-1, data processing unit 234-2, and data display control unit 234-3.

The data communication unit 234-1 implements a function of controlling the NET I/F device 237 and receiving various kinds of information transmitted from the server apparatus 102 via the Internet 105. More specifically, the data communication unit 234-1 implements a function of receiving time information, recording order, and time interval information associated with each frame of the image data. The data communication unit 234-1 also implements a function of receiving the above-described correction log information.

The data processing unit 234-2 implements a function of calculating, based on various kinds of information transmitted from the server apparatus 102, various data representing correction contents when the internal clock of the server apparatus 102 was corrected.

The data display control unit 234-3 implements a function of displaying the correction contents of time correction based on various data calculated by the data processing unit 234-2 by controlling the display device 236.

<3. Sequence of Process in Server Apparatus 102>

Figure 3:
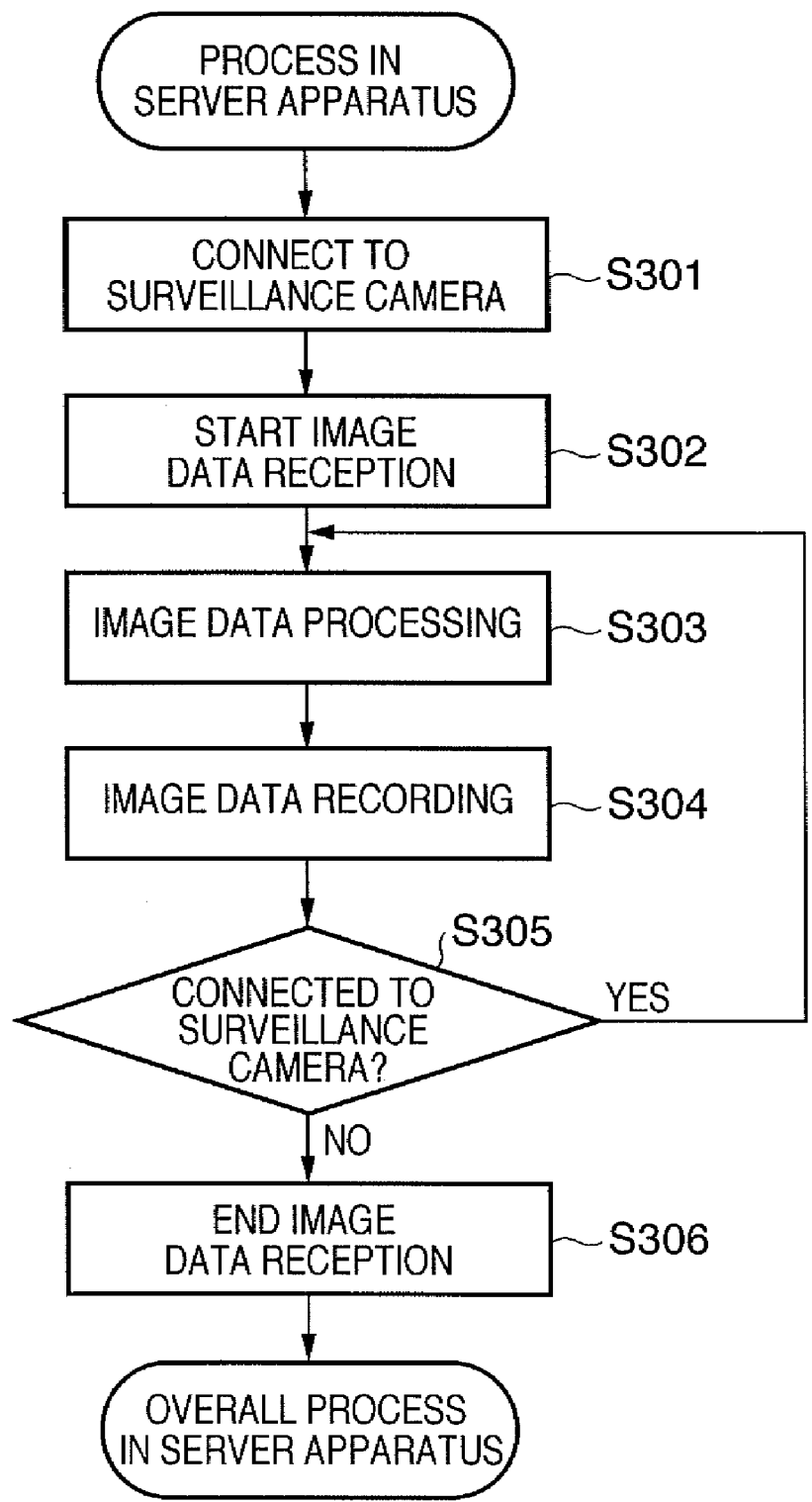
FIG. 3 is a flowchart illustrating the sequence of the overall process in the server apparatus 102.

The sequence of the process in the server apparatus 102 will be described next. FIG. 3 is a flowchart illustrating the sequence of the overall process in the server apparatus 102. Note that the central processing unit 212 executes various control programs stored in the storage device 214, thereby implementing the following process.

In step S301, communication connection with the surveillance camera 101 is established. In step S302, the server apparatus 102 starts receiving image data transmitted from the surveillance camera 101 via the Internet 105.

The surveillance camera 101 continuously transmits image data acquired during image capturing to the server apparatus 102 while communication connection with the server apparatus 102 is established. However, image capturing need not always be performed continuously and can be done intermittently while communication connection with the server apparatus 102 is established. When image capturing is executed intermittently, image data transmission temporarily stops between the cycles of image capturing (in this case, image data is discontinues).

In step S303, time information (when the time of the internal clock is corrected, time information after correction) acquired from the internal clock of the server apparatus 102 is successively associated with all frames contained in the image data.

In step S304, the image data processed in step S303 is recorded in the image data recording device 218.

In step S305, it is determined whether communication connection with the surveillance camera 101 is being established. If it is determined that communication connection is being established, the process returns to step S303. On the other hand, if it is determined in step S305 that communication connection with the surveillance camera 101 is terminated, the process advances to step S306, and image data reception is ended.

<4. Sequence of Process in Terminal Apparatus 104>

The sequence of a display process executed by the terminal apparatus 104 to display "correction contents" when the time of the internal clock of the server apparatus 102 was corrected will be described next.

<4.1 Correction Contents Display Method>

A display example of the correction contents of time correction, which are displayed by the terminal apparatus 104, will be described first.

Figure 4:
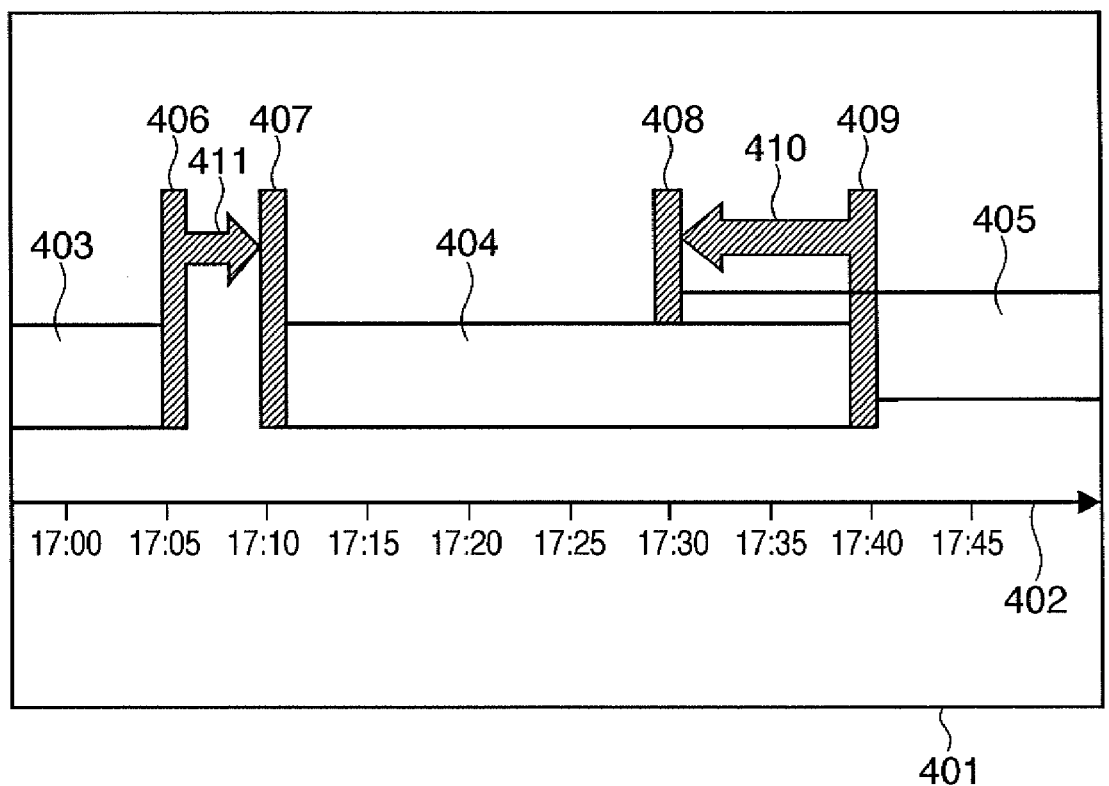
FIG. 4 is a view showing a display example of the correction contents of time correction, which are displayed by the terminal apparatus 104.

FIG. 4 is a view showing a display example of the correction contents of time correction, which are displayed by the terminal apparatus 104. As shown in FIG. 4, the terminal apparatus 104 of this embodiment displays the following notations in a display area as the correction contents of time correction during a predetermined image data recording period.

Notations Representing That Image Data was Recorded

Notations representing that time correction of the internal clock was executed, and notations representing the correction direction and amount of correction.

A display area 401 displays the correction contents. A time line 402 is a predetermined time line indicating an image data recording period. In the example shown in FIG. 4, the time line indicates a recording period from time "17:00" to time "17:45" and is graduated in 5 min.

Notations 403 to 405 indicate that image data was continuously recorded during the recording period.

Notations 406 and 407 indicate that time correction of the internal clock of the server apparatus 102 was executed (the notations respectively indicate times before and after correction of the time information). An arrow 411 indicates an amount of correction and correction direction of the time correction of the internal clock of the server apparatus 102.

As is apparent from these notations, in the example in FIG. 4, the internal clock of the server apparatus 102 was corrected at time "17:05", and the time changed to "17:10" as a result of the time correction. That is, the amount of correction is 5 min, and the correction direction is a direction to advance the time. The notations 403 and 404 do not continue on the display. However, the image data continues.

Similarly, notations 408 and 409 indicate that time correction of the internal clock of the server apparatus 102 was executed (the notations respectively indicate times before and after correction of the time information). An arrow 410 indicates an amount of correction and correction direction of the time correction of the internal clock of the server apparatus 102.

As is apparent from these notations, in the example in FIG. 4, the internal clock of the server apparatus 102 was corrected at time "17:40", and the time changed to "17:30" as a result of the time correction. That is, the amount of correction is 10 min, and the correction direction is a direction to return the time. The notations 404 and 405 do not continue on the display. However, the image data continues.

As described above, these notations allow the user to recognize the timing, amount, and method of time correction at a glance.

<4.2 Sequence of Process of Displaying Correction Contents>

The sequence of a process executed by the terminal apparatus 104 to display the correction contents of time correction as shown in FIG. 4 will be described next. Note that the central processing unit 232 executes various control programs stored in the storage device 234, thereby implementing the processes shown in FIGS. 5 to 7.

Note that the terminal apparatus 104 receives at least time information, recording order, and correction log information associated with image data from the server apparatus 102 before executing the process.

4.2.1 Sequence of Overall Process

Figure 5:
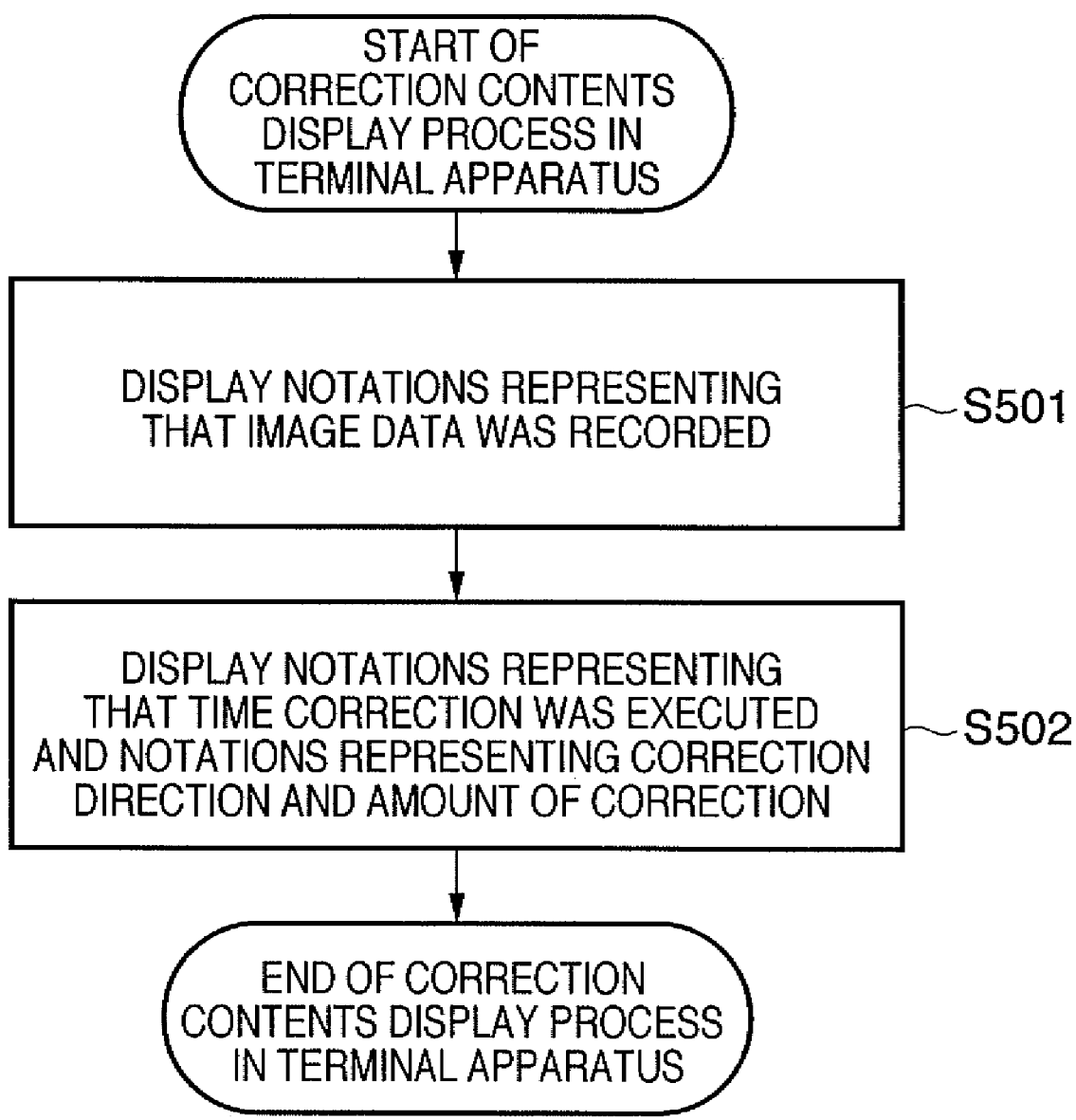
FIG. 5 is a flowchart illustrating the sequence of the correction contents display process of the terminal apparatus 104.

The sequence of the overall process (correction contents display process) in the terminal apparatus 104 will be described first. FIG. 5 is a flowchart illustrating the sequence of the correction contents display process of the terminal apparatus 104.

In step S501, the terminal apparatus 104 displays, based on the time information associated with the image data, notations representing that image data was continuously recorded during a predetermined recording period displayed in the display area 401. In step S502, the terminal apparatus 104 displays, based on the time information and correction log information associated with the image data, notations representing that time correction of the internal clock was executed. Notations representing the amount of correction and correction direction are also displayed.

Figure 6:
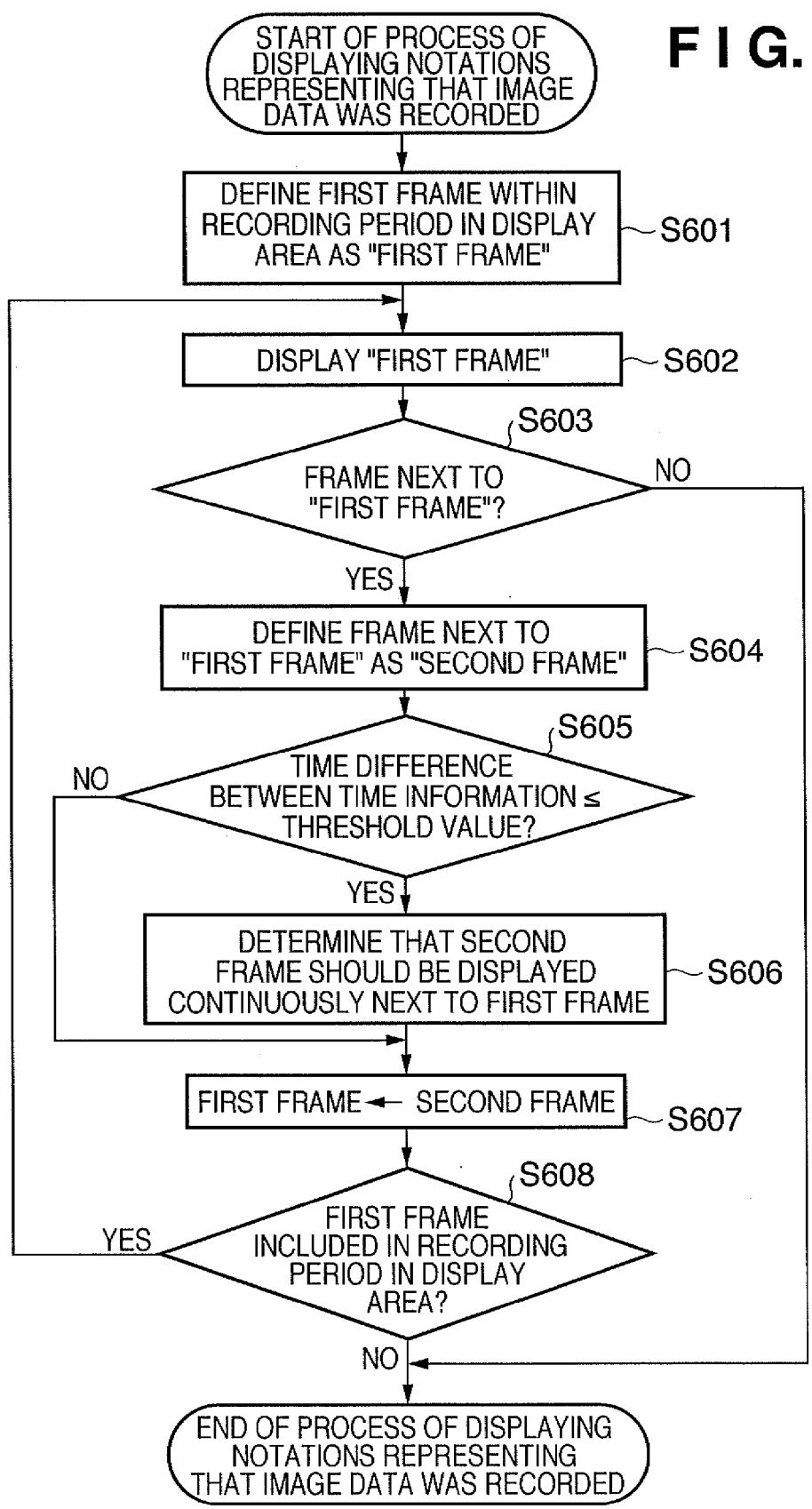
FIG. 6 is a flowchart illustrating the sequence of a process of displaying notations (403 to 405 in FIG. 4) representing that image data was recorded.

4.2.2 Details of Process (Step S501) of Displaying Notations Representing That Image Data Was Recorded FIG. 6 is a flowchart illustrating the sequence of the process in the data processing unit 234-2. The flowchart shows the sequence of the process of displaying notations (403 to 405 in FIG. 4) representing that image data was recorded.

In step S601, frames associated with pieces of time information included in the recording period displayed in the display area 401 are read out. A frame associated with the earliest one of the pieces of readout time information is selected. The selected frame is defined as a "first frame".

In step S602, a notation representing that image data was recorded is displayed at a position on the time line in the display area corresponding to the time information associated with the "first frame".

In step S603, it is determined whether a frame next to the "first frame" exists. If it is determined in step S603 that no next frame exists, the process is ended. If it is determined in step S603 that a frame next to the "first frame" exists, the process advances to step S604 to define the next frame as a "second frame".

In step S605, it is determined whether the difference between the time information associated with the "first frame" and that associated with the "second frame" is equal to or smaller than a predetermined threshold value.

If it is determined in step S605 that the time difference between the time information associated with the "first frame" and that associated with the "second frame" is equal to or smaller than the predetermined threshold value, the process advances to step S606. In step S606, it is determined that the "first frame" and "second frame" should be displayed continuously.

If it is determined that the time difference between the time information associated with the "first frame" and that associated with the "second frame" is larger than the predetermined threshold value, or after the process in step S606, the process advances to step S607. In step S607, the frame defined as the "second frame" is redefined as the "first frame".

In step S608, it is determined whether the time information associated with the redefined "first frame" is included in the displayed recording period.

If it is determined in step S608 that the time information is included in the displayed recording period, the process returns to step S602. In step S602, a notation representing that the "first frame" was recorded is displayed in correspondence with the time information associated with the redefined "first frame". If it was determined in step S606 that the frames should be displayed continuously, the redefined "first frame" is displayed continuously next to the "first frame" before redefinition (the two frames are displayed without any interval). Conversely, if it was not determined that the frames should be displayed continuously, the redefined "first frame" is displayed next to the "first frame" before redefinition at an interval corresponding to the time difference between time information along the time line 402.

If it is determined in step S608 that the time information is not included in the displayed recording period, the process is ended.

In FIG. 4, the notations 403, 404, and 405 representing that image data was recorded indicate that it was determined that the frames included in the notations should be displayed continuously. To the contrary, the frame at the top of the notation 404 has a time difference larger than the predetermined threshold value with respect to the frame at the end of the notation 404. This indicates that it was not determined that the frames should be displayed continuously. Similarly, the frame at the top of the notation 405 has a time difference larger than the predetermined threshold value with respect to the frame at the end of the notation 404. This indicates that it was not determined that the frames should be displayed continuously.

With the above-described process, the notations (403 to 405 in FIG. 4) representing that image data was recorded are displayed.

Figure 7:
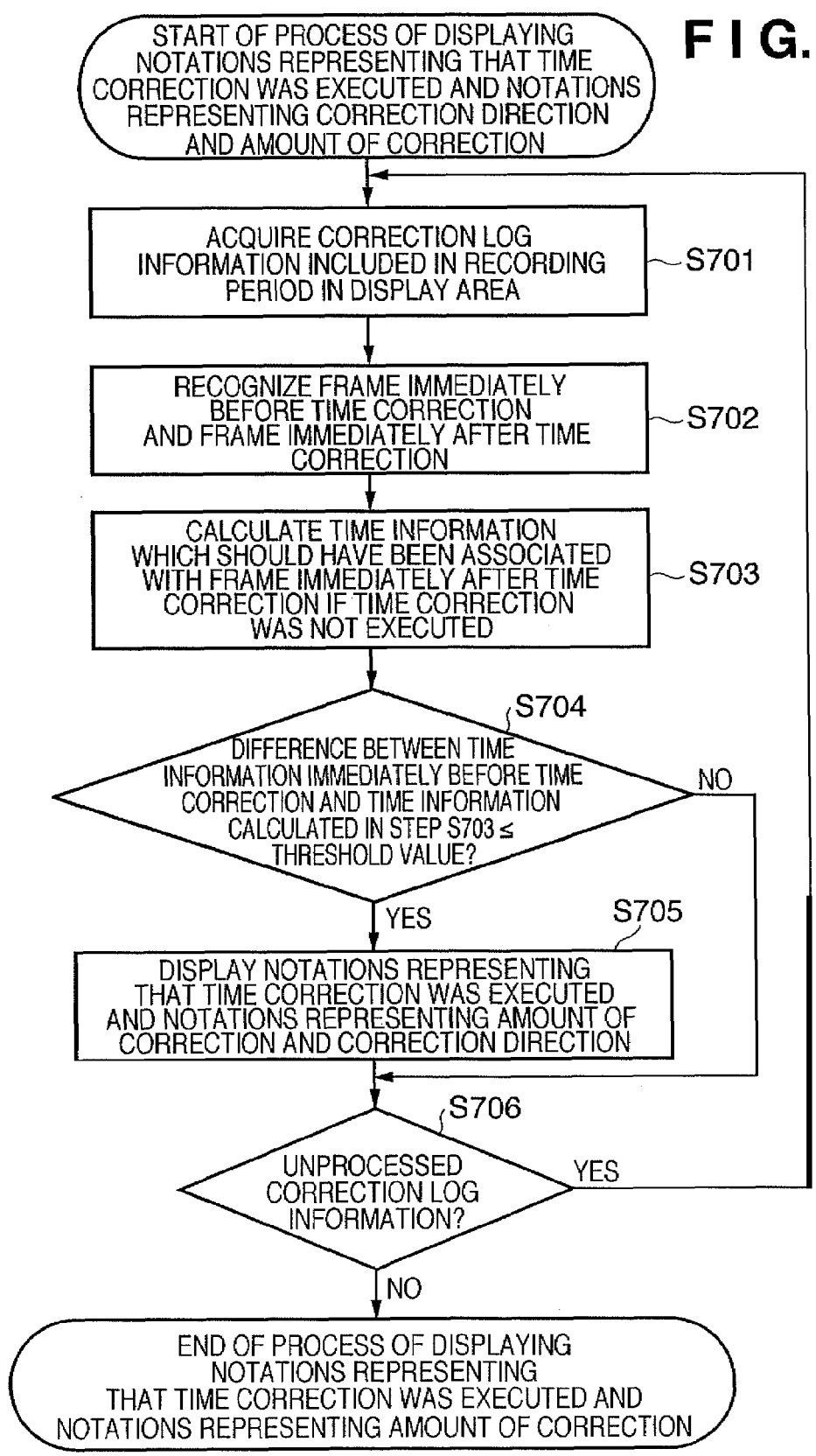
FIG. 7 is a flowchart illustrating the sequence of a process of displaying notations representing that time correction was executed and notations representing an amount of correction and correction direction.

4.2.3 Details of Process (Step S502) of Displaying Notations Representing That Time Correction Was Executed and Notations Representing Amount of Correction And Correction Direction FIG. 7 is a flowchart illustrating the sequence of a process of displaying notations representing that time correction was executed and notations representing an amount of correction and correction direction.

In step S701, correction log information included in the displayed recording period is acquired. In step S702, two continuous frames that satisfy the following conditions are extracted.

Pieces of time information associated with the two frames have a difference.

The direction of the difference between the time information matches the correction direction.

The amount of the difference between the time information almost equals the amount of correction.

The time information associated with the later one of the two frames in the recording order is closer to the timing of time correction.

Two frames that satisfy the above conditions are recognized as a frame recorded immediately before the correction and a frame recorded immediately after the correction when time information was corrected.

In step S703, the time information associated with the frame immediately after the correction, which is recognized in step S702, is moved (added or subtracted) by the amount of correction in a direction reverse to the correction direction. With this process, time information which should have been associated with the frame immediately after the time correction if the time correction was not executed is calculated.

In step S704, it is determined whether the difference between the time information associated with the frame immediately before the time correction, which is recognized in step S702, and the time information which should have been associated with the frame immediately after the time correction, which is calculated in step S702, is equal to or smaller than a predetermined threshold value.

If it is determined in step S704 that the difference between the time information is equal to or smaller than the predetermined threshold value, the process advances to step S705.

In step S705, a notation representing that time correction was executed is displayed at the position of time information which should have been associated with the frame immediately after time correction. In the example in FIG. 4, the notation 406 or 409 is displayed. In addition, a notation representing that time correction was executed is displayed at the position of the frame immediately after the time correction. In the example in FIG. 4, the notation 407 or 408 is displayed. Notations representing the correction direction and amount of correction are also displayed between the notations representing that time correction was executed. In the example in FIG. 4, the arrow 411 or 410 is displayed.

After the process in step S705, the process advances to step S706. In step S706, it is determined whether all pieces of correction log information included in the displayed recording period have undergone the process. If it is determined in step S706 that unprocessed correction log information remains in the acquired correction log information, the process returns to step S701. If it is determined that all pieces of correction log information have undergone the process, the process is ended.

As is apparent from the above description, in this embodiment, notations representing that image data was recorded, notations representing that time correction of the internal clock was executed, and notations representing the correction direction and amount of correction are displayed as the correction contents when the time of the internal clock was corrected.

This allows the user to easily grasp the correction contents of time correction.

Second Embodiment

In the above first embodiment, notations representing that image data was recorded, notations representing that time correction of the internal clock was executed, and notations representing the amount of correction and correction direction are displayed as the correction contents when the time of the internal clock was corrected. However, the notation method is not particularly limited to this. For example, notations representing that image data was recorded and notations representing that time correction was executed may be displayed on a time line with two types of scales to display correction contents.

<1. Sequence of Process in Terminal Apparatus 104>

The sequence of a display process of displaying, on a terminal apparatus 104, correction contents when the time of an internal clock arranged in a server apparatus 102 was corrected according to this embodiment will be described.

<1.1 Correction Contents Display Method>

A display example of correction contents displayed by the terminal apparatus 104 according to this embodiment will be described.

Figure 8:
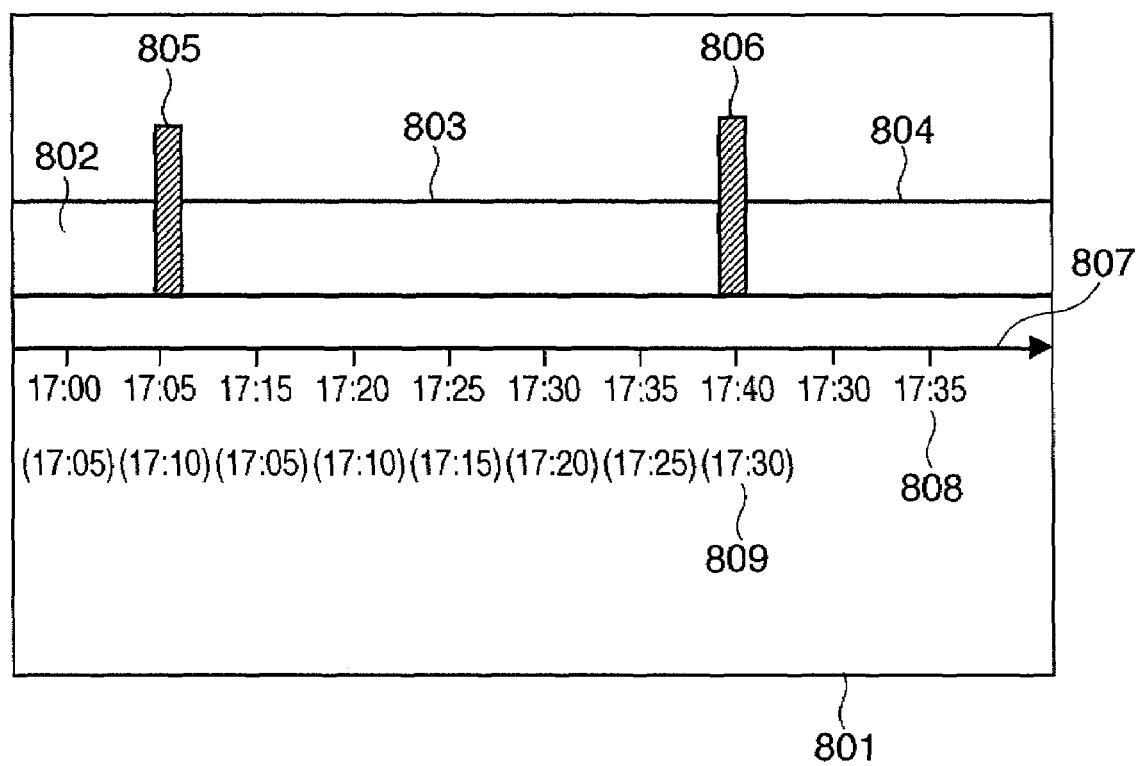
FIG. 8 is a view showing a display example of correction contents displayed by a terminal apparatus 104 according to the second embodiment.

FIG. 8 is a view showing a display example of correction contents displayed by the terminal apparatus 104 according to this embodiment. In this embodiment, the following notations are displayed in a display area to show the contents of time correction of the internal clock during a predetermined recording period, as shown in FIG. 8.

Notations representing that image data was recorded

Notations representing that time correction was executed

Scales drawn in the advancing direction of the time line from the timing of time correction and scales drawn in the reverse direction of the time line A display area 801 displays the correction contents. Notations 802 to 804 indicate that image data was continuously recorded during the recording period.

Notations 805 and 806 indicate that time correction of the internal clock of the server apparatus 102 was executed.

A time line 807 indicates the advancing direction of time by scales at a predetermined time interval. Scales 808 are those of the time line 807 and are drawn in the advancing direction of time from the timing of time correction serving as a reference. Scales 809 are those of the time line 807 and are drawn in the reverse direction of time from the timing of time correction serving as a reference.

As is apparent from these notations, in the example in FIG. 8, image data was continuously recorded since before time "17:00" on the scale 808. The first time correction of the internal clock of the server apparatus 102 was done at time "17:05", and the time was corrected to "17:10".

At time "17:05", the time of the internal clock was 5 min behind the standard time. Even before that time, the time of the internal clock is assumed to have been behind the standard time. In this case, it is possible to grasp the estimated time (standard time) of image data recording by referring to the scales 809 (scales drawn in the reverse direction of time from the timing of time correction serving as a reference). For example, the frame recorded at time "17:00" of the internal clock is supposed to have been recorded at time "(17:05)" by calculating from the time corrected by the first time correction.

When time correction is performed at time "17:05" on the scale 808, and the internal clock is corrected to "17:10", time information is associated with the image data based on time "17:10" from then. For this reason, the scales 808 are noted "17:15", "17:20", . . . from this point of time.

As is apparent, in the example in FIG. 8, the image data was continuously recorded even after the first time correction of the internal clock. The second time correction of the internal clock of the server apparatus 102 was done at time "17:40" on the scale 808, and the time was corrected to "17:30".

At time "17:40", the time of the internal clock was 10 min ahead of the standard time. Even before that time, the time of the internal clock is assumed to have been ahead of the standard time. In this case, it is possible to grasp the estimated time (standard time) of image data recording by referring to the scales 809. For example, the frame recorded at time "17:35" of the internal clock is supposed to have been recorded at time "(17:25)" by calculating from the time corrected by the second time correction.

When time correction is performed at time "17:40" on the scale 808, and the internal clock is corrected to "17:30", time information is associated with the image data based on time "17:30" from then. For this reason, the scales 808 are noted "17:35", "17:40", . . . from this point of time.

As described above, these notations allow the user to recognize the timing, amount, and method of time correction at a glance. Additionally, the user can recognize the recording time of each frame as the standard time.

A detailed process of performing the display shown in FIG. 8 will be described below with reference to the flowcharts shown in FIGS. 9 to 13. Note that the terminal apparatus 104 receives time information, time interval information, recording order, and correction log information associated with image data transmitted from the server apparatus 102 before executing the processes shown in FIGS. 9 to 13.

<1.2 Sequence of Process of Displaying Correction Contents>

The sequence of a process executed by the terminal apparatus 104 to display the correction contents of time correction as shown in FIG. 8 will be described next.

1.2.1 Sequence of Overall Process

Figure 9:
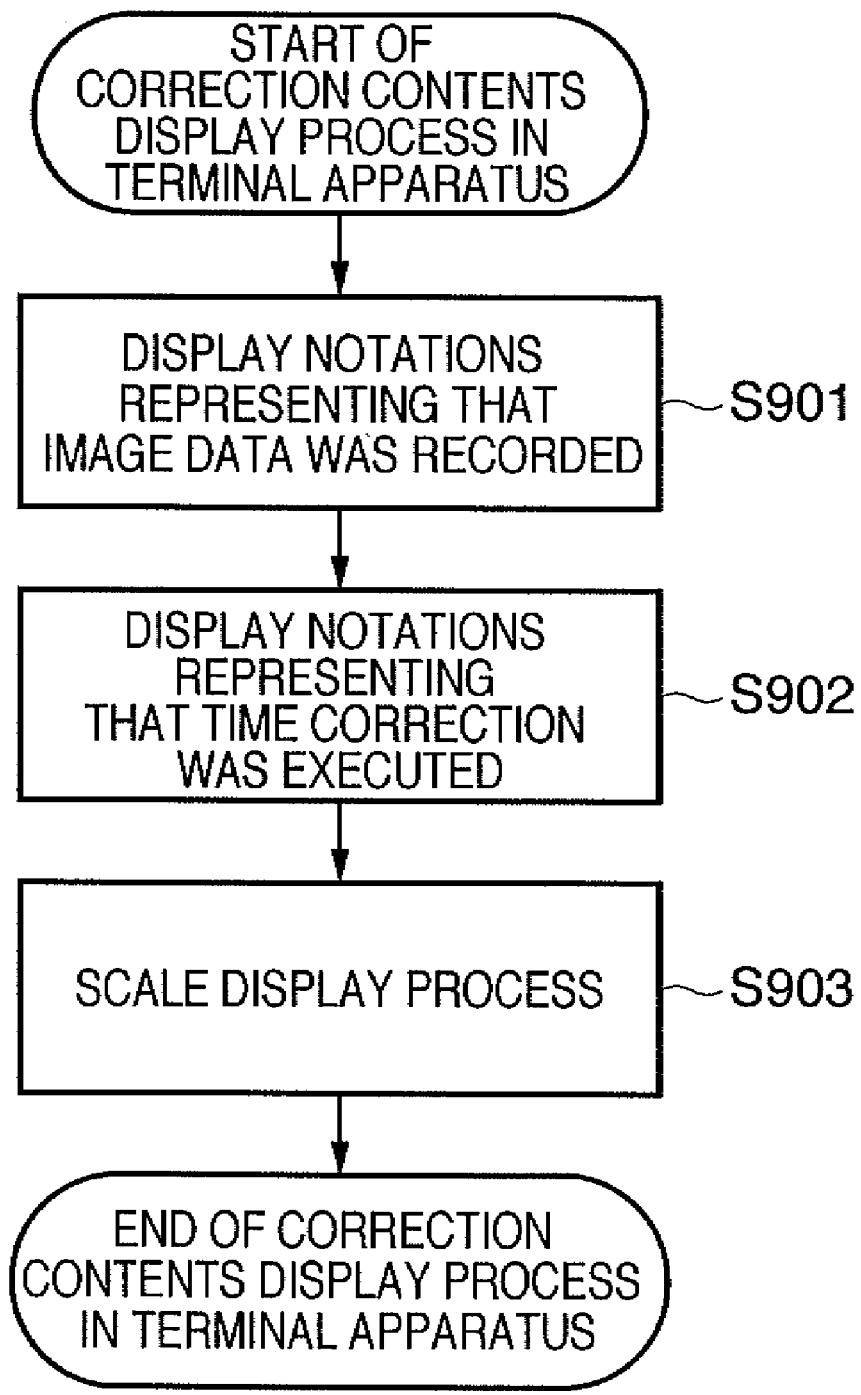
FIG. 9 is a flowchart illustrating the sequence of a correction contents display process.

The sequence of the overall process (correction contents display process) executed by the terminal apparatus 104 to display the correction contents of time correction as shown in FIG. 8 will be described first. FIG. 9 is a flowchart illustrating the sequence of the correction contents display process. Note that a central processing unit 232 executes various control programs stored in a storage device 234, thereby implementing the processes shown in FIGS. 9 to 13.

In step S901, the terminal apparatus 104 displays, based on the time information and time interval information associated with the image data, notations representing that image data was recorded during a predetermined recording period displayed in the display area 801.

In step S902, the terminal apparatus 104 displays, based on the time information and correction log information associated with the image data, notations representing that time correction of the internal clock was executed.

In step S903, the terminal apparatus 104 displays scales in the advancing direction of the time line from the timing of time correction serving as a reference, which are calculated based on the time interval corresponding to the distance from the reference. The terminal apparatus 104 also displays scales in the reverse direction of the time line from the timing of time correction serving as a reference, which are calculated based on the time interval corresponding to the distance from the reference.

Figure 10:
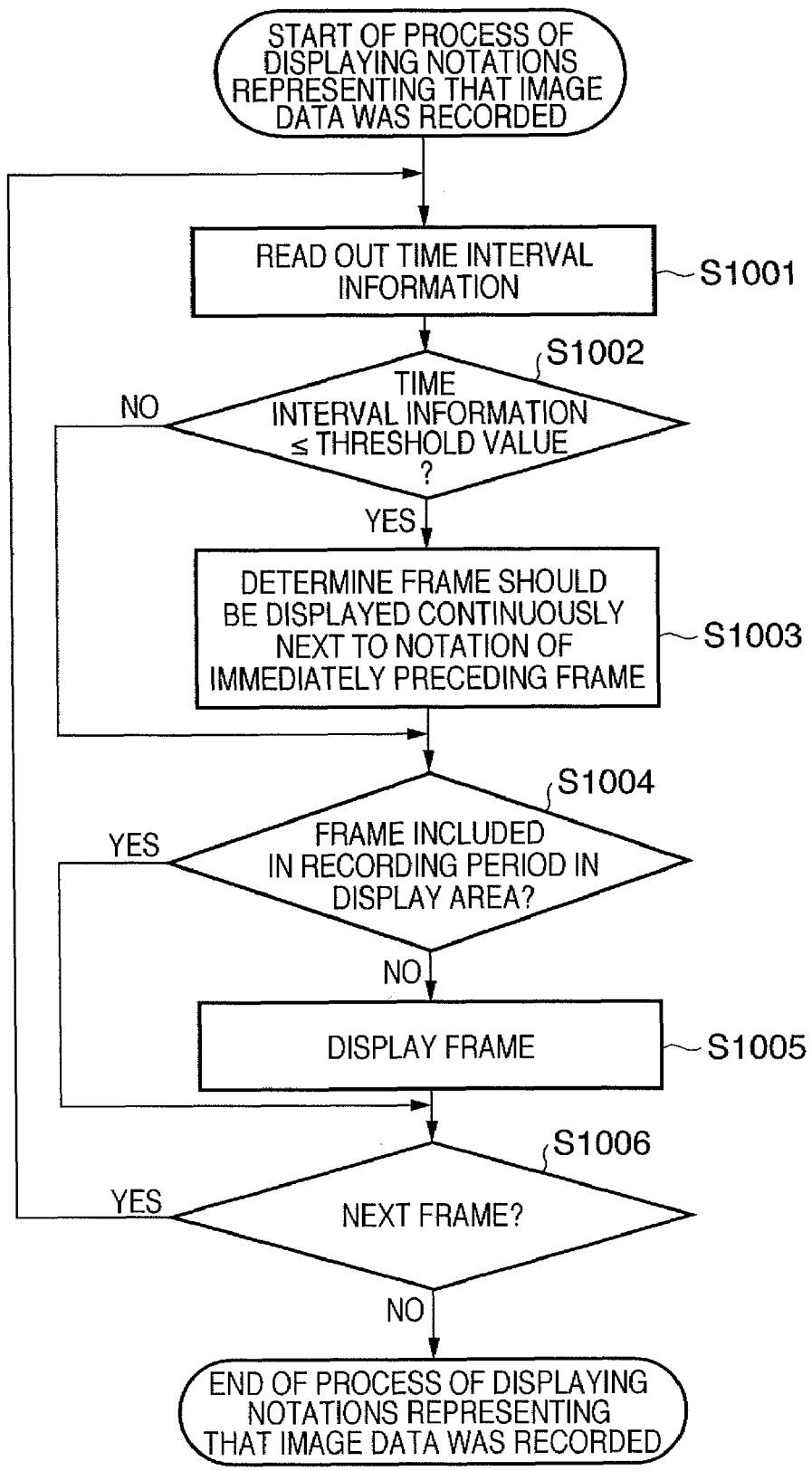
FIG. 10 is a flowchart illustrating the sequence of a process of displaying notations (802 to 804 in FIG. 8) representing that image data was recorded.

1.2.2 Details of Process (Step S901) of Displaying Notations Representing That Image Data Was Recorded FIG. 10 is a flowchart illustrating the sequence of the process in a data processing unit 234-2. The flowchart shows the sequence of the process of displaying notations (802 to 804 in FIG. 8) representing that image data was recorded.

In step S1001, the time interval information associated with each frame of the image data is read out.

In step S1002, it is determined whether the time interval information read out in step S1001 is equal to or smaller than a predetermined threshold value.

If it is determined in step S1002 that the time interval information is equal to or smaller than the predetermined threshold value, the process advances to step S1003. In step S1003, it is determined that the frame associated with the time interval information read out in step S1001 should be displayed continuously next to the immediately preceding frame.

If it is determined in step S1002 that the time interval information is larger than the predetermined threshold valuer or after the process in step S1003, the process advances to step S1004.

In step S1004, it is determined by referring to the time information associated with the frame associated with the time interval information read out in step S1001 whether the time information is included in the recording period in the display area 801.

If it is determined in step S1004 that the time information is included in the recording period in the display area 801, the process advances to step S1005. In step S1005, a notation representing that the frame was recorded with a delay corresponding to the time interval information with respect to the immediately preceding frame is displayed. If it was determined in step S1003 that the frames should be displayed continuously, the notation representing that the frame was recorded is displayed continuously next to the immediately preceding frame (the two frames are displayed without any interval). Conversely, if it was not determined that the frames should be displayed continuously, the notation representing that the frame was recorded is displayed next to the immediately preceding frame at an interval corresponding to the time interval information along the time line 807.

In step S1006, it is determined whether a frame next to the frame associated with the time interval information read out in step S1001 exists. If it is determined in step S1006 that the next frame exists, the process returns to step S1001 to read out the time interval information associated with the next frame and execute the same process as described above.

If it is determined in step S1006 that no next frame exists, the process is ended.

As described above, the notations representing that image data was recorded are displayed using time interval information associated with each frame. This allows accurately expressing continuity/discontinuity independently of the presence/absence of time correction of the internal clock of the server apparatus 102.

1.2.3 Details of Process (Step S902) of Displaying Notations Representing That Time Correction Was Executed FIG. 11 is a flowchart illustrating details of a process (step S902) of displaying notations (805 and 806 in FIG. 8) representing that time correction was executed.

In step S1101, correction log information is acquired. In step S1102, two continuous frames whose pieces of associated time information satisfy the following conditions are extracted.

Pieces of time information associated with the two frames have a difference.

The direction of the difference between the time information matches the correction direction.

The amount of the difference between the time information almost equals the amount of correction.

The time information associated with the later one of the two frames in the recording order is closer to the timing of time correction.

Two frames that satisfy the above conditions are recognized as a frame recorded immediately before the correction and a frame recorded immediately after the correction when time correction was executed. The time information associated with each frame is read out.

In step S1103, the time information associated with, of the two frames extracted in step S1102, the frame immediately before the time correction is read out. The time difference between the readout time information and the time before the correction at the timing of time correction is calculated.

In step S1104, the time information associated with, of the two frames extracted in step S1102, the frame immediately after the time correction is read out. The time difference between the readout time information and the time (standard time) after the correction at the timing of time correction is calculated.

In step S1105, the ratio of the time difference calculated in step S1103 to that calculated in step S1104 is calculated. A notation representing that time correction was performed is displayed at a position corresponding to the calculated ratio between the notations representing that the two frames extracted in step S1102 were recorded.

In step S1106, it is determined whether all pieces of correction log information have undergone the process. If it is determined in step S1106 that not all pieces of correction log information have undergone the process, the process returns to step S1101. If it is determined that all pieces of correction log information have undergone the process, the process is ended.

This process enables displaying a notation representing that time correction was performed at an appropriate position on the time line even when notations representing that image data was recorded are discontinuous, and the time correction was executed in a time period without image data recording.

1.2.4 Process of Displaying Scales

Figure 12A:
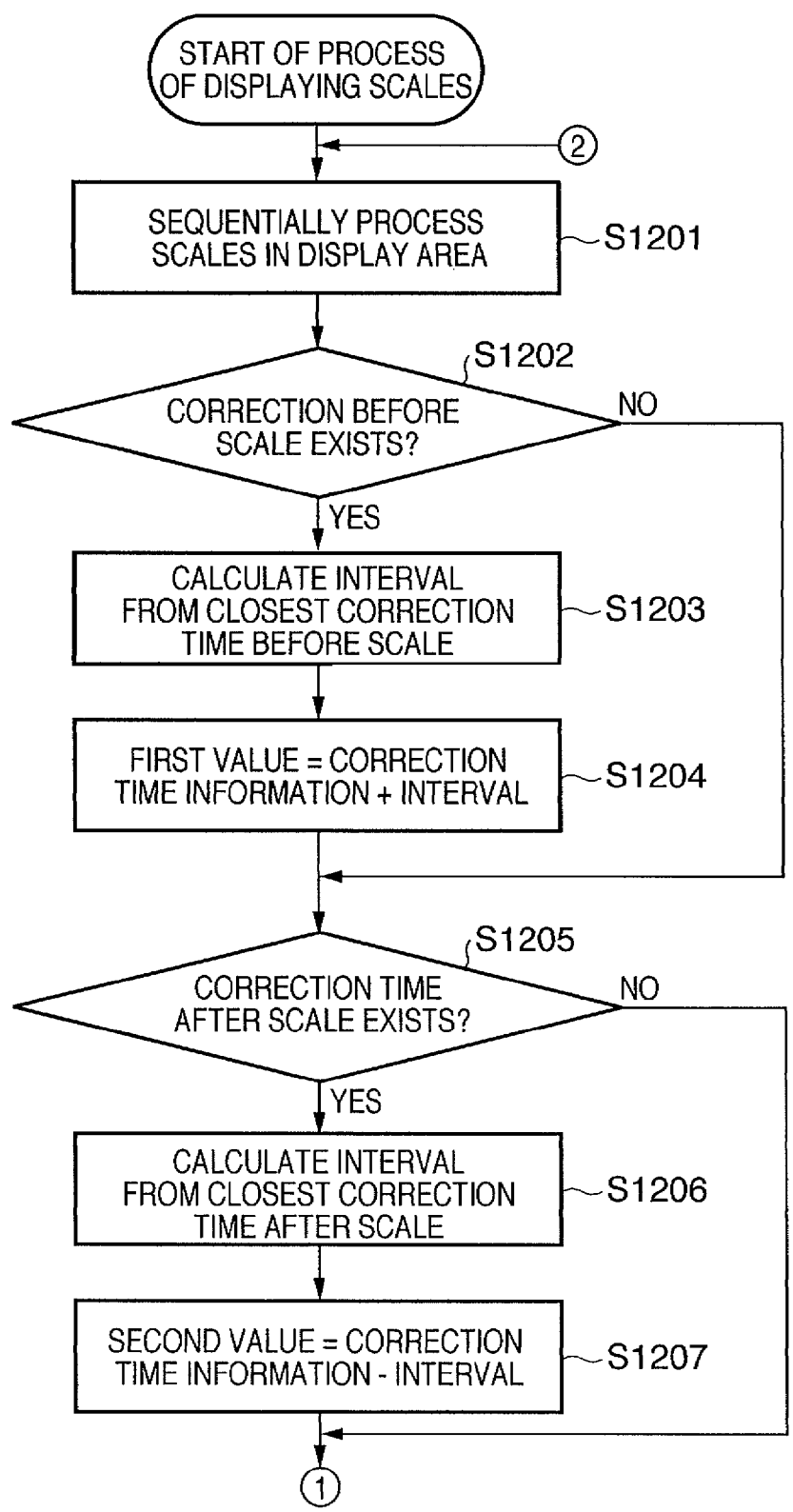
FIGS. 12A and 12B are flowcharts illustrating the sequence of a process of displaying scales (808 and 809 in FIG. 8)
Figure 12B:
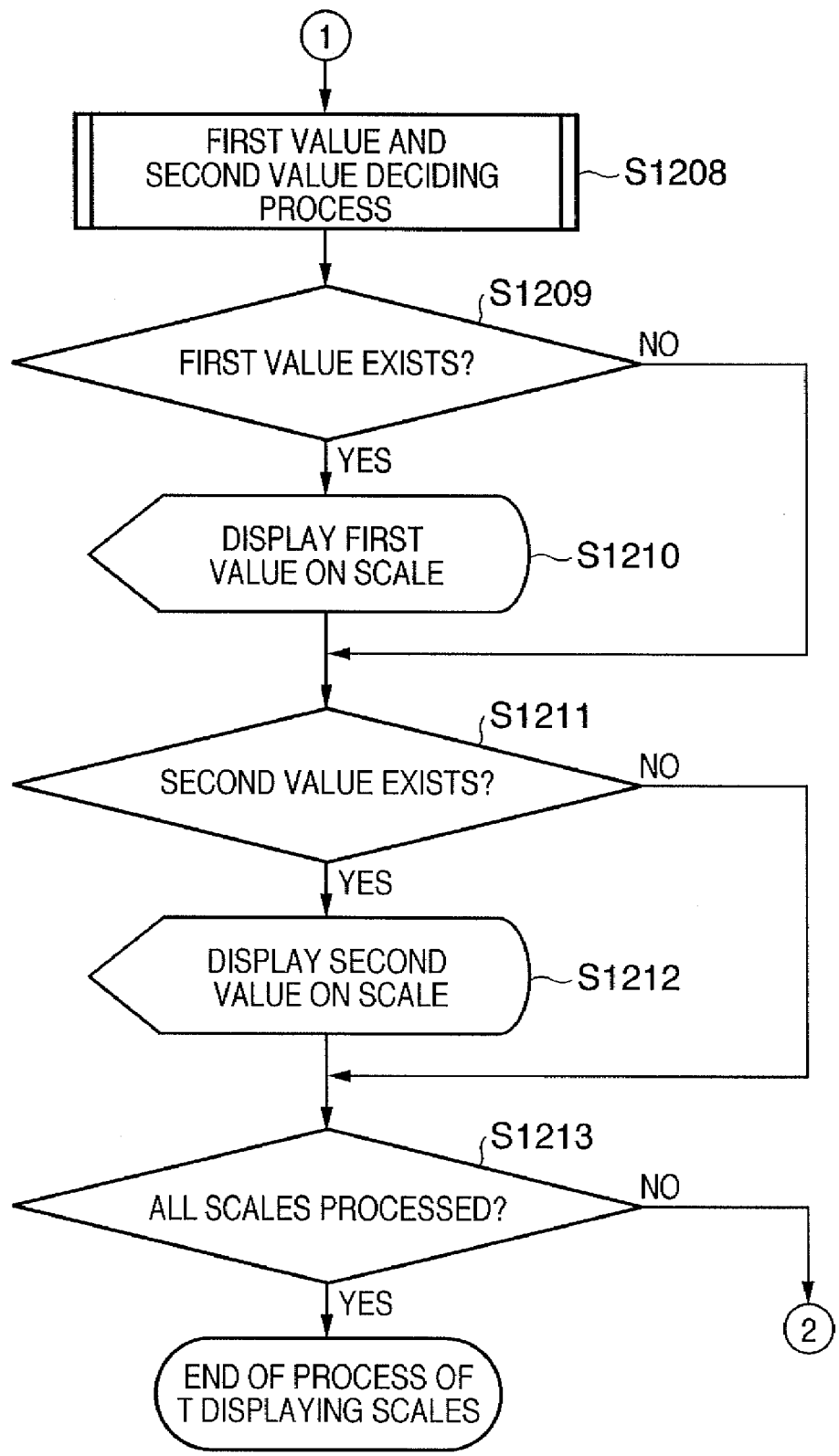

FIGS. 12A and 12B are flowcharts illustrating the sequence of a process of displaying scales (808 and 809 in FIG. 8).

In step S1201, the scales to be displayed on the time line 807 within the recording period in the display area 801 are read out. In step S1202, it is determined based on the correction log information whether time correction which occurred before the display position of the readout scales exists.

If it is determined in step S1202 that time correction which occurred before the scale display position exists, the process advances to step S1203. In step S1203, the closest notation which represents that time correction was performed and is located before the scale display position is extracted. The distance to the scale display position is obtained, and the time interval corresponding to the distance on the time line is calculated.

In step S1204, the time interval calculated in step S1203 is added to the timing of time correction obtained in step S1203 to derive a first scale value. In this process, it is possible to calculate the scale in the advancing direction of the time line from the timing of time correction serving as a reference based on the time interval corresponding to the distance from the reference and derive it as the first scale value.

On the other hand, if it is determined in step S1202 that time correction which occurred before the scale display position does not exist, or after the process in step S1203, the process advances to step S1204.

In step S1205, it is determined based on the correction log information whether time correction which occurred after the display position of the readout scales exists.

If it is determined in step S1205 that time correction which occurred after the scale display position exists, the process advances to step S1206. In step S1206, the closest notation which represents that time correction was performed and is located after the scale display position is extracted. The distance to the scale display position is obtained, and the time interval corresponding to the distance on the time line is calculated.

In step S1207, the time interval calculated in step S1206 is subtracted from the timing of time correction obtained in step S1206 to derive a second scale value. In this process, it is possible to calculate the scale in the reverse direction of the time line from the timing of time correction serving as a reference based on the time interval corresponding to the distance from the reference and derive it as the second scale value.

If it is determined in step S1205 that time correction which occurred after the scale display position does not exist, or after the process in step S1207, the process advances to step S1208.

In step S1208, the scales (808 and 809 in FIG. 8) are decided (to be described later in detail).

In step S1209, it is determined whether the first scale value exists. If it is determined that the value exists, the process advances to step S1210 to add the first scale value to a corresponding position on the time line within the displayed recording period.

If it is determined in step S1209 that the first scale value does not exist, or after the process in step S1210, the process advances to step S1211.

In step S1211, it is determined whether the second scale value exists. If it is determined that the value exists, the process advances to step S1212 to add the second scale value to a corresponding position on the time line within the displayed recording period.

If it is determined in step S1211 that the second scale value does not exist, or after the process in step S1212, the process advances to step S1213.

In step S1213, it is determined whether all scales within the recording period in the display area 801 have undergone the process. If it is determined that not all scales have undergone the process, the process returns to step S1201. On the other hand, if it is determined that all scales have undergone the process, the process is ended.

As is apparent from the above description, in this embodiment, notations representing that image data was recorded, notations representing that time correction was executed, and scales in two directions based on the standard time are displayed as the correction contents when the time of the internal clock was corrected.

This allows the user to easily grasp the correction contents of time correction.

Third Embodiment

In the second embodiment, the scales in the advancing direction of the time line, which are calculated based on the time interval corresponding to the distance from the reference, are displayed on the upper side, whereas the scales in the reverse direction of the time line, which are calculated based on the time interval corresponding to the distance from the reference, are displayed on the lower side. However, the present invention is not particularly limited to this.

For example, a more accurate time based on the timing of time correction may be displayed on the upper side as a first scale.

Figure 13:
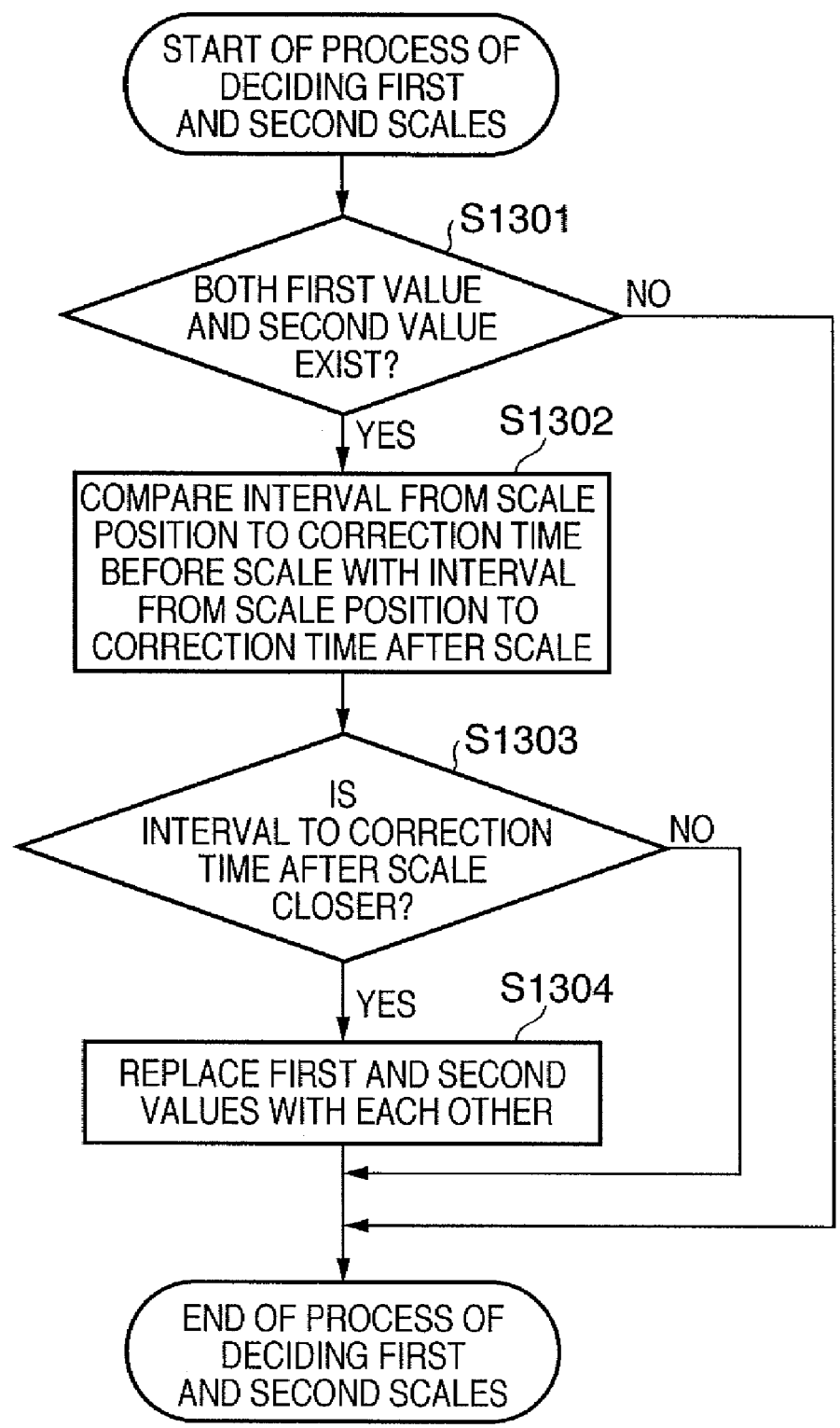
FIG. 13 is a flowchart illustrating the detailed sequence of a process of deciding the scales (808 and 809 in FIG. 8) in step S1208 in FIG. 12B.

FIG. 13 is a flowchart illustrating the detailed sequence of a process of deciding scales (808 and 809 in FIG. 8) in step S1208 in FIG. 12B.

In step S1301, it is determined whether both the first scale value calculated in step S1204 and the second scale value calculated in step S1207 exist. If it is determined in step S1301 that one of them does not exist, or if it is determined that neither exist, the process is ended.

If it is determined in step S1301 that both the first scale value and the second scale value exist, the process advances to step S1302.

In step S1302, the time interval calculated in step S1203 is compared with that calculated in step S1206.

In step S1303, it is determined whether the time interval calculated in step S1206 is shorter.

If it is determined in step S1303 that the time interval calculated in step S1206 is shorter, the process advances to step S1304 to replace the first and second scale values with each other.

If it is determined in step S1303 that the time interval calculated in step S1206 is longer, or after the process in step S1304, the process is ended.

This allows displaying a more accurate time based on the timing of time correction on the upper side of a display area 801 as a first scale.

Fourth Embodiment

In the third embodiment, in the scale value deciding process, when the time interval calculated in step S1206 is shorter than that calculated in step S1203, the first and second scale values are replaced with each other. However, the present invention is not particularly limited to this.

For example, before time interval comparison, it may be determined whether the time interval calculated in step S1206 is equal to or smaller than a predetermined threshold value.

Figure 14:
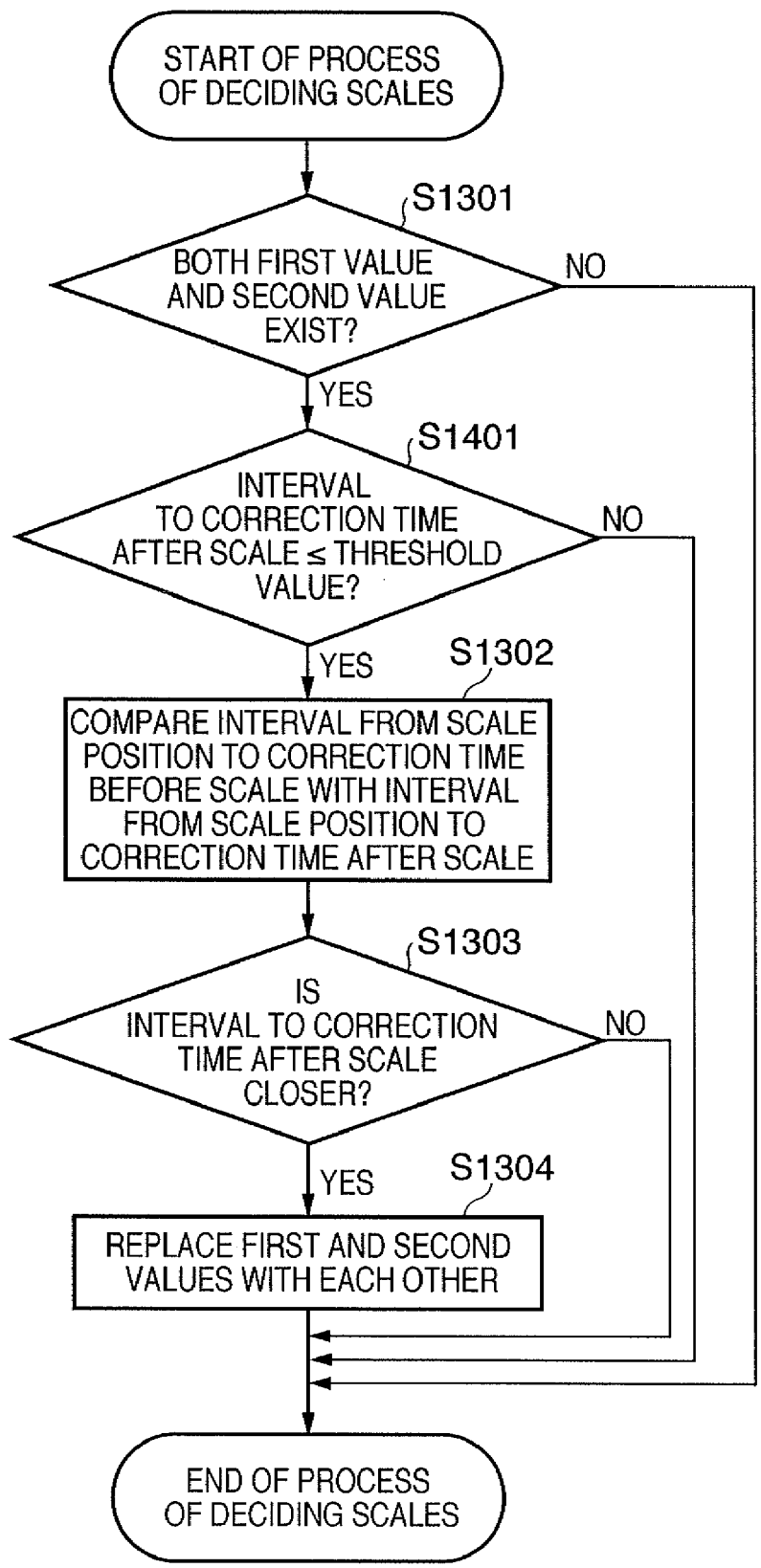
FIG. 14 is a flowchart illustrating the detailed sequence of a process of deciding scale values in step S1208 in FIG. 12B according to the fourth embodiment.

FIG. 14 is a flowchart illustrating the detailed sequence of a process of deciding scale values in step S1208 in FIG. 12B according to this embodiment.

In step S1301, it is determined whether both the first scale value calculated in step S1204 and the second scale value calculated in step S1207 exist. If it is determined in step S1301 that one of them does not exist, or if it is determined that neither exist, the process is ended.

If it is determined in step S1301 that both the first scale value and the second scale value exist, the process advances to step S1401.

In step S1401, it is determined whether the time interval calculated in step S1206 is larger than a predetermined threshold value. If it is determined that the time interval calculated in step S1206 is larger than the predetermined threshold value, the process is ended.

If it is determined that the time interval is equal to or smaller than the predetermined threshold value, the process advances to step S1302 to compare the time interval calculated in step S1203 with that calculated in step S1206.

In step S1303, it is determined whether the time interval calculated in step S1206 is shorter.

If it is determined in step S1303 that the time interval calculated in step S1206 is shorter, the process advances to step S1304 to replace the first and second scale values with each other.

If it is determined in step S1303 that the time interval calculated in step S1206 is longer, or after the process in step S1304, the process is ended.

This allows to preferentially display, as the first scale, the scale in the advancing direction of the time line from the reference, that is, the timing of time correction, which is calculated based on the time interval corresponding to the distance from the reference.

Fifth Embodiment

In the first to fourth embodiments, image data transmitted from the surveillance camera is recorded in the server apparatus 102. However, electronic data to be processed is not particularly limited to this. The electronic data is not particularly limited to image data if it is transmitted in a predetermined transmission unit (process unit). The electronic data can be, for example, temperature data or rotational speed data. In this case, however, the unit associated with time information is not a frame but a unit of transmission of the temperature data or rotational speed data to the server apparatus.

In the first to fourth embodiments, time information and the like are associated with each frame. However, the present invention is not particularly limited to this. The information may be recorded in another area of an image data recording device 218 in association with each frame.

In the first to fourth embodiments, the correction contents of time correction executed in the server apparatus are displayed on the terminal apparatus. However, the present invention is not particularly limited to this. The display function of the terminal apparatus may be imparted to the server apparatus itself so that the correction contents are displayed on it.

In the first to fourth embodiments, time information acquired from the internal clock arranged in the server apparatus is associated with image data. However, the present invention is not particularly limited to this. Time information acquired from the internal clock of another apparatus may be associated with image data.

Other Embodiments

The present invention is also applicable to a system including a plurality of devices (e.g., a host computer, interface device, reader, and printer) or an apparatus (e.g., a copying machine or facsimile apparatus) including a single device.

The object of the present invention is achieved even by supplying a storage medium which records software program codes for implementing the functions of the above-described embodiments to the system or apparatus. In this case, the computer (or CPU or MPU) of the system or apparatus reads out and executes the program codes stored in the storage medium to implement the above functions. In this case, the storage medium which stores the program codes constitutes the present invention.

Examples of the storage medium to supply the program codes are a Floppy® disk, hard disk, optical disk, magnetooptical disk, CD-ROM, CD-R, magnetic tape, nonvolatile memory card, and ROM.

The functions of the above-described embodiments are implemented not only when the computer executes the readout program codes but also when the OS (Operating System) running on the computer partially or wholly executes actual processing based on the instructions of the program codes.

The functions of the above-described embodiments are also implemented when the program codes read out from the storage medium are written in the memory of a function expansion board inserted into the computer or a function expansion unit connected to the computer. That is, after the program codes are written in the memory, the CPU of the function expansion board or function expansion unit partially or wholly executes actual processing based on the instructions of the program codes, thereby implementing the function of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-044530 filed on Feb. 23, 2007, which is hereby incorporated by reference herein in its entirety.

What is claimed is:

1. An information processing apparatus comprising:
a display control device which controls a display device so as to display, on a time line, information representing that electronic data is recorded by a recording control device in accordance with time information from a timer of the recording control device; and
a processing device which acquires timer correction information which represents that the timer of the recording control device is corrected from a first time to a second time,
wherein the display control device controls the display device based on time information corresponding to the electronic data and the timer correction information so as to display both (a) first time information which represents that the electronic data is recorded at a time corresponding to the first time and (b) second time information which represents that the electronic data is recorded at a time corresponding to the second time, on the time line on which the information representing that the electronic data is recorded is displayed.

2. The apparatus according to claim 1, wherein when two pieces of the time information associated with two pieces of the electronic data recorded continuously in order have a time difference not more than a predetermined threshold value, the display control device controls the display device so as to display a notation representing that the two pieces of the electronic data corresponding to the two pieces of the time information are continuously recorded.

3. The apparatus according to claim 1, wherein the display control device controls the display device so as to display, on the time line, an image representing a direction from a position corresponding to the first time information before the correction to a position corresponding to the second time information after the correction.

4. The apparatus according to claim 1, wherein the display control device controls the display device so as to display a first scale in an advancing direction of the time line from a position corresponding to the second time information after the correction, which is calculated based on a time interval corresponding to a distance from the position, and a second scale in a reverse direction of the time line from the position, which is calculated based on a time interval corresponding to a distance from the position.

5. The apparatus according to claim 1, wherein the display control device transmits timer correction information to the display device connected via the network such that the first time information and the second time information are displayed on the time line of the display device.

6. The apparatus according to claim 1, wherein the display control device determines whether or not frames recorded immediately before and immediately after a time when the timer is corrected are recorded in a predetermined period, and controls the display device so as to display both the first time information and the second time information when it is determined that the frames recorded immediately before and immediately after the time when the timer is corrected are recorded in the predetermined period.

7. A display control method of an information processing apparatus, the method comprising the steps of:
controlling a display device so as to display, on a time line, information representing that electronic data is recorded by a recording control device in accordance with time information from a timer of the recording control device; and
acquiring timer correction information which represents that the timer of the recording control device is corrected from a first time to a second time,
wherein the controlling step controls the display device based on time information corresponding to the electronic data and the timer correction information so as to display both (a) first time information which represents that the electronic data is recorded at a time corresponding to the first time and (b) second time information which represents that the electronic data is recorded at a time corresponding to the second time, on the time line on which the information representing that the electronic data is recorded is displayed.

8. The method according to claim 7, wherein when two pieces of the time information associated with two pieces of the electronic data recorded continuously in order have a time difference not more than a predetermined threshold value, the controlling step controls the display device so as to display a notation representing that the two pieces of the electronic data corresponding to two pieces of the time information is continuously recorded.

9. The method according to claim 7, wherein the controlling step controls the display device so as to display, on the time line, an image representing a direction from a position corresponding to the first time information before the correction to a position corresponding to the second time information after the correction.

10. The method according to claim 7, wherein the controlling step controls the display device so as to display a first scale in an advancing direction of the time line from a position corresponding to the second time information after the correction, which is calculated based on a time interval corresponding to a distance from the position, and a second scale in a reverse direction of the time line from the position, which is calculated based on a time interval corresponding to a distance from the position.

11. The method according to claim 7, wherein timer correction information is transmitted to the display device connected via the network in the controlling step such that the first time information and the second time information are displayed on the time line of the display device.

12. A non-transitory computer-readable storage medium which stores a control program to cause a computer to execute a display control method of an information processing apparatus, the display control method comprising the steps of:
controlling a display device so as to display, on a time line, information representing that electronic data is recorded by a recording control device in accordance with time information from a timer of the recording control device; and
acquiring timer correction information which represents that the timer of the recording control device is corrected from a first time to a second time,
wherein the controlling step controls the display device based on time information corresponding to the electronic data and the timer correction information so as to display both (a) first time information which represents that the electronic data is recorded at a time corresponding to the first time and (b) second time information which represents that the electronic data is recorded at a time corresponding to the second time on the time line on which the information representing that the electronic data is recorded is displayed.

13. The non-transitory computer-readable storage medium according to claim 12, wherein when two pieces of the time information associated with two pieces of the electronic data recorded continuously in order have a time difference not more than a predetermined threshold value, the controlling step controls the display device so as to display a notation representing that the two pieces of the electronic data corresponding to two pieces of the time information are continuously recorded.

14. The non-transitory computer-readable storage medium according to claim 12, wherein the controlling step controls the display device so as to display, on the time line, an image representing a direction from a position corresponding to the first time information before the correction to a position corresponding to the second time information after the correction.

15. The non-transitory computer-readable storage medium according to claim 12, wherein the controlling step controls the display device so as to display a first scale in an advancing direction of the time line from a position corresponding to the second time information after the correction, which is calculated based on a time interval corresponding to a distance from the position, and a second scale in a reverse direction of the time line from the position, which is calculated based on a time interval corresponding to a distance from the position.

16. The non-transitory computer-readable storage medium according to claim 12, wherein the controlling step determines whether or not frames recorded immediately before and immediately after a time when the timer is corrected are recorded in a predetermined period, and controls the display device so as to display both the first time information and the second time information when it is determined that the frames recorded immediately before and immediately after the time when the timer is corrected are recorded in the predetermined period.

17. An information processing system comprising:
an acquiring device which acquires electronic data;
a recording control device which controls a memory so as to record the electronic data acquired by the acquiring device;
a display control device which controls a display device so as to display, on a time line, information representing that the electronic data is recorded by the recording control device in accordance with time information from a timer of the recording control device; and
a processing device which acquires timer correction information which represents that the timer of the recording control device is corrected from a first time to a second time,
wherein the display control device controls the display device based on time information corresponding to the electronic data and the timer correction information so as to display both (a) first time information which represents that the electronic data is recorded at a time corresponding to the first time and (b) second time information which represents that the electronic data is recorded at a time corresponding to the second time, on the time line on which the information representing that the electronic data is recorded is displayed.

18. The system according to claim 17, wherein the display control device controls the display device so as to display an image representing a direction from a position corresponding to the first time information before the correction to a position corresponding to the second time information after the correction on the time line.

* * * * *